Jan. 31, 1961 T. J. BEASLEY 2,969,681
GYROSCOPIC APPARATUS
Filed April 28, 1958 3 Sheets-Sheet 1

INVENTOR.
THOMAS J. BEASLEY

Jan. 31, 1961 T. J. BEASLEY 2,969,681
GYROSCOPIC APPARATUS
Filed April 28, 1958 3 Sheets-Sheet 2

*INVENTOR.*
THOMAS J. BEASLEY

Jan. 31, 1961 T. J. BEASLEY 2,969,681
GYROSCOPIC APPARATUS
Filed April 28, 1958 3 Sheets-Sheet 3

*INVENTOR.*
THOMAS J. BEASLEY

United States Patent Office 2,969,681
Patented Jan. 31, 1961

2,969,681

GYROSCOPIC APPARATUS

Thomas J. Beasley, Canoga Park, Calif., assignor to Lear, Incorporated

Filed Apr. 28, 1958, Ser. No. 731,352

6 Claims. (Cl. 74—5.4)

This invention relates to gyroscopes, and particularly to a gyroscopic system for inertially stable platforms and the like, which is capable of sensing, measuring and correcting for drift errors normally inherent in a gyroscope.

Ever increasing demands for accuracy have produced successive refinements in the design of gyroscopes used for aircraft and missile guidance purposes. While decreasing the tolerances for machined surfaces and refining methods of balancing gyro rotors, taking into account the nonisoelastic deflection characteristics of gyro structures under applied accelerations and various other refinements have produced excellent results in terms of reducing gyroscopic errors, no method has heretofore been found to detect and correct for all random drift errors of a gyroscope. This invention contemplates a gyroscopic system which is capable of detecting random drift errors of the gyroscope and of applying a suitable correction to counteract these errors.

The cause of errors in gyroscopes, though physically due to faulty bearings, applied accelerations, and nonisoelastic conditions, etc., may be characterized physically as an error torque vector. This vector, like all vector quantities, has a magnitude and direction. Thus, though the gyroscope may be disturbed by a number of torques, each having a magnitude and direction, the total of these various torques at any one instant may be replaced for purposes of analysis by a single torque having a single magnitude and a single direction.

This invention contemplates the provision of a gyro rotor having diametrically opposed holes drilled in its rim and which is thus statically balanced but dynamically unbalanced. This dynamic unbalance then gives rise to an oscillation of the gyro case at a frequency twice the rotor spin frequency if the gyro is subject to a disturbing torque. The phase relation between this oscillation and the rotor spin frequency (which is constant) determines the direction of the disturbing torque vector. A corrective torque is then applied to the gyro in the correct direction to eliminate the disturbing torque vector.

It is an object of this invention to provide means for detecting the magnitude and direction of any disturbing torque experienced by a gyroscope having two degrees of freedom, and to apply to the gyroscope corrective torque of the proper magnitude and direction to counteract the disturbing torque.

It is another object of this invention to provide gyroscopic stabilizing equipment of increased accuracy.

It is another object of this invention to provide gyroscopic apparatus capable of detecting the magnitude and direction of its own disturbing torques.

It is another object of this invention to provide means for detecting the presence of disturbing torques on a gyroscope.

It is another object of this invention to provide a method of detecting and correcting gyroscope error torques.

It is another object of this invention to provide a two-degree of freedom gyroscope together with means for detecting the magnitude ant direction of a disturbing torque and further means for applying corrective torques to the two axes of freedom of the gyroscope of the proper magnitude to counteract said disturbing torque.

Other objects of this invention will become apparent from the following description taken in connection with the accompanying drawings, in which.

Figure 1:
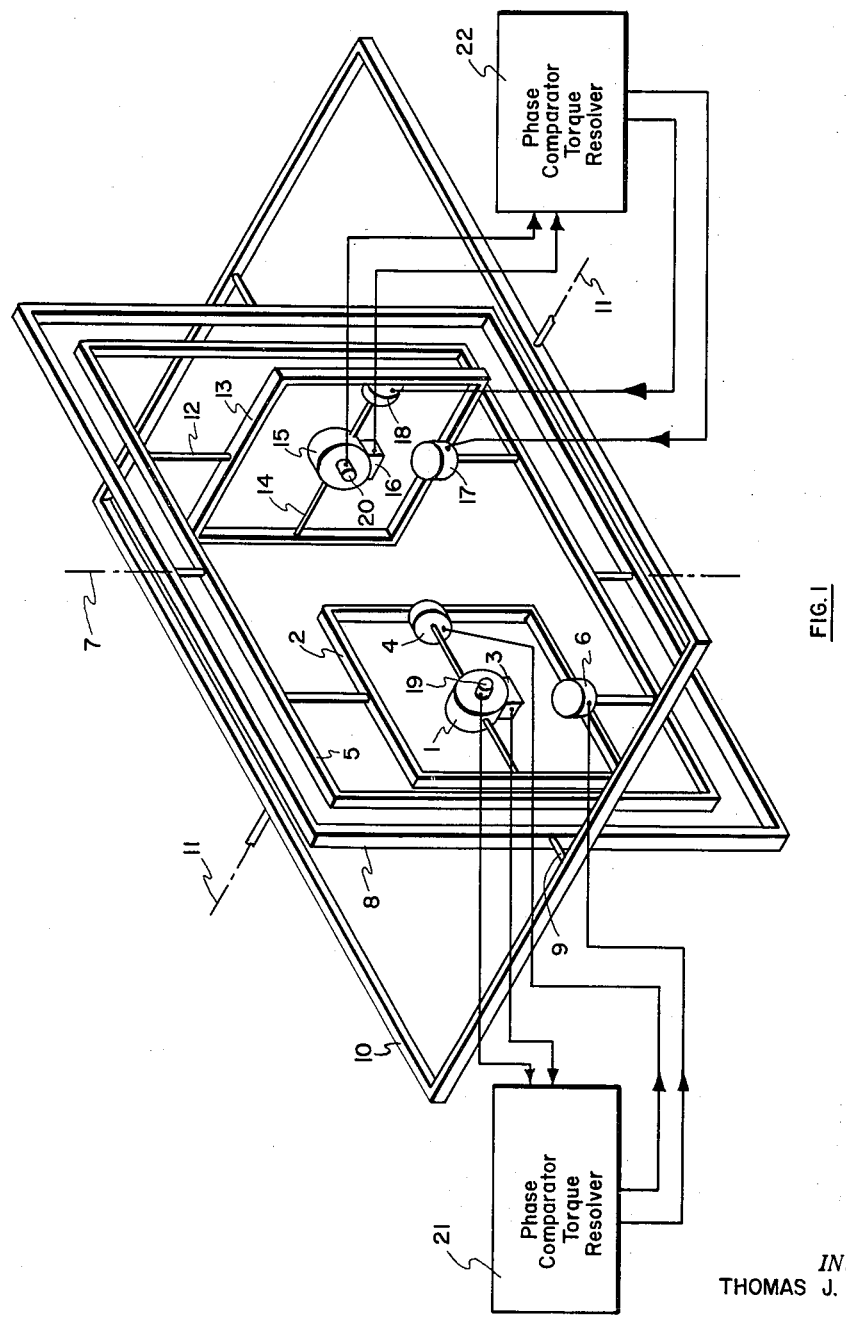
Fig. 1 is a schematic diagram of the invention.

Referring now to the drawings, and in particular to Fig. 1, there is shown a simplified stick diagram of a two-gyro platform incorporating a self-correcting gyroscopic system of this invention. In Fig. 1, gyro 1 is mounted for a single degree of angular freedom in gimbal 2 and carries on its case, accelerometer 3. Gyro 1 incorporates a statically balanced but dynamically unbalanced rotor. A torquer 4 is provided to apply torque between gyro 1 and gimbal 2. Gimbal 2 in turn is mounted for a single degree of angular freedom normal to the first degree of angular freedom of the gyro in gimbal 5. A torquer 6 is capable of applying torque between gimbal 2 and gimbal 5 about the axis of freedom of gimbal 2. Gimbal 5 in turn is supported for angular freedom about the vertical axis 7 in gimbal 8. As in a typical two-gyro platform, gimbal 8 is supported for angular freedom about axis 9 in gimbal 10, which in turn is supported in an airframe about axis 11. Also supported in gimbal 5 about axis 12 is a gimbal 13 which supports about axis 14 gyro 15 having mounted on it angular accelerometer 16. Torquers 17 and 18 are capable of applying torques between gimbals 5 and 13 and gimbal 13 and gyro 15, respectively, as shown. Each gyroscope has mounted on its spin axis a reference generator, such as reference generator 19 on gyro 1, and reference generator 20 on gyro 15. The outputs of reference generator 19 and accelerometer 3 are connected to the input of phase-comparator torque-resolver 21, whose outputs are fed to torquers 4 and 6. Similarly, reference 20 and accelerometer 16 are connected to the input of phase-comparator torque-resolver 22. The outputs of this device are connected to control torquers 17 and 18, as shown.

Figure 3:
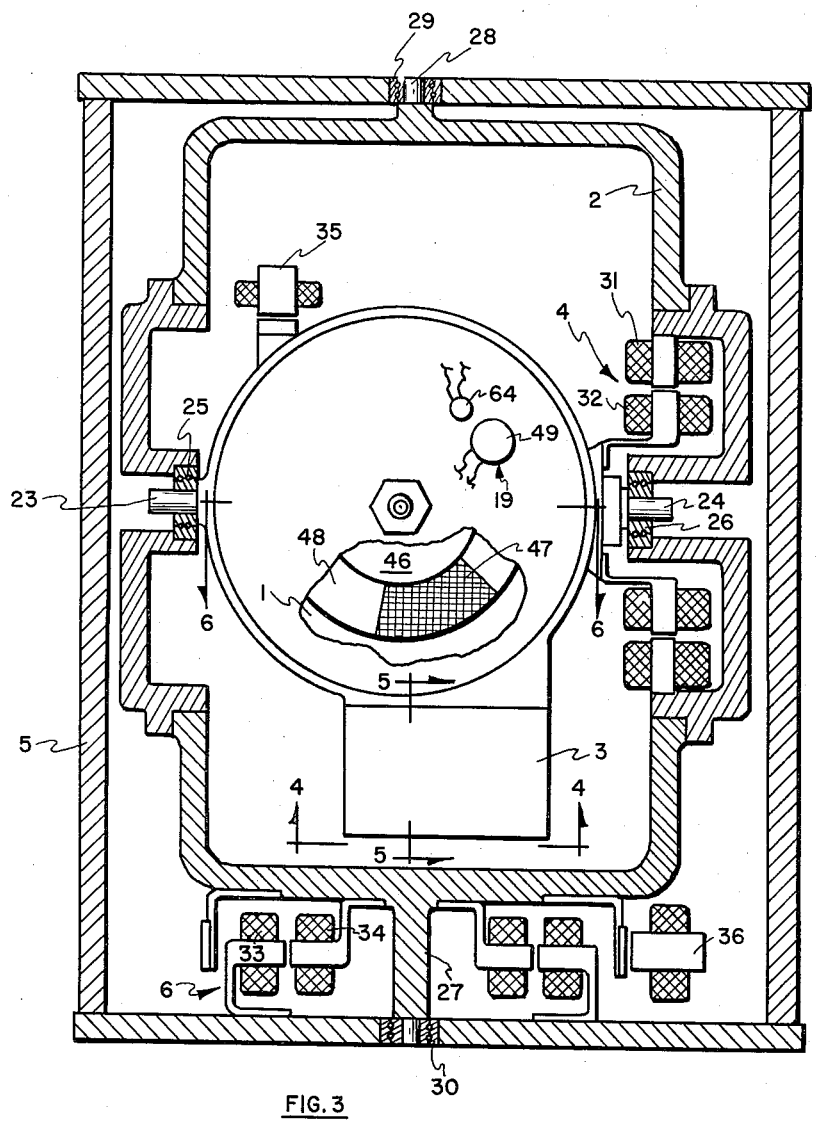
Fig. 3 is a detailed view of the gyroscopic apparatus of this invention.

Referring now to Fig. 3, there is shown apparatus corresponding to that associated with gyro 1 in Fig. 1. Gyro 1 is shown in Fig. 3 with its spin axis normal to the plane of the figure. The casing of gyro 1 is attached integrally to stub shafts 23 and 24, which are supported on bearings 25 and 26 in gimbal 2. Gimbal 2 in turn has attached to its stub shafts 27 and 28, which in turn are supported on gimbal 5 by bearings 29 and 30. Accelerometer 3 is integrally attached to the casing of gyro 1 and its sensitive axis lies parallel to the axis formed by stub shafts 23 and 24. The stator 31 of torquer 4 is attached to gimbal 2, while the rotor 32 thereof is attached to the casing of gyro 1. Stator 33 of torquer 6 is attached to gimbal 5, while rotor 34 of torquer 6 is attached to gimbal 2. In this way torquer currents furnished to these two torquers are effective to apply torques about the two orthogonally disposed non-spin axes of gyro 1, as shown. Pickoffs 35 and 36 are provided, as shown, to detect the relative angular displacement of the gyro with respect to surrounding equipment as in a conventional gyroscope.

Figure 4:
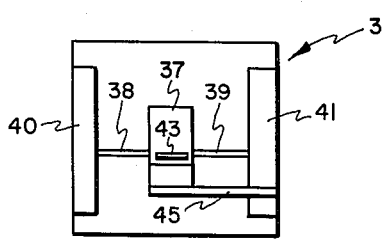
Fig. 4 is a sectional view of the device shown in Fig. 3, taken at 4—4 in Fig. 3.
Figure 5:
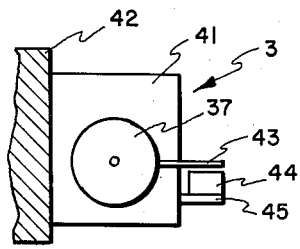
Fig. 5 is a sectional view of the device shown in Fig. 3, taken at 5—5 in Fig. 3.

Referring now to Figs. 4 and 5, the details of accelerometer 3 are shown. As has been noted, accelerometer 3 is attached integrally to the casing of gyro 1. Accelerometer 3 is an angular accelerometer and is comprised of a balanced cylindrical mass 37 integrally attached by torsionally deflectable cylindrical rods 38 and 39 to end posts 40 and 41, which in turn are integrally attached to base member 42 of accelerometer 3 integrally mounted to the gyroscope casing. Also integrally attached to cylindrical mass 37 is paddle member 43, which extends radially outward from the center of cylindrical mass 37. Paddle 43 is one element of a conventional position pickoff, the other portion of which is constituted by stationary pickoff element 44 attached to base 42 by insulating strip 45.

Referring again to Fig. 3, one form in which reference generator 19 may be provided is shown. In Fig. 3, a portion of the case of gyro 1 is broken away to reveal the end of rotor 46 of gyro 1. It can be seen that the end of rotor 46 has painted upon it an annulus consisting of alternate light and dark segments. These segments are provided and arranged so that there are two dark segments 47 and two light segments 48 disposed alternately around the wheel. Mounted on the case are photocell 49 and light source 64 in such a manner that light from light source 64 is projected upon the annular pattern made up of light and dark portions 47 and 48, respectively, and the reflected light serves to energize photocell 49. Photocell 49 then generates a square-wave signal having a frequency which is double the rotative frequency of the gyroscope rotor. Alternatively, an electromagnetic or other conventional type reference generator may be provided.

Figure 2:
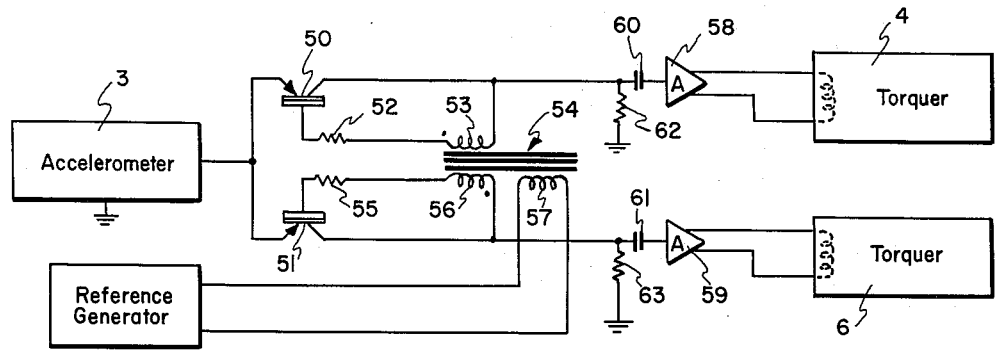
Fig. 2 is a detailed circuit diagram of a portion of the invention.

Referring now to Fig. 2, the output of accelerometer 3 is fed in parallel to the emitters of transistors 50 and 51, as shown. The base and collector of transistor 50 are connected together through resistor 52 and secondary winding 53 of transformer 54, as shown, while in a similar manner the base and collector of transistor 51 are connected together through resistor 55 and secondary winding 56 of transformer 54. Primary winding 57 of transformer 54 is connected to the output of reference generator 19, as shown. Secondary windings 53 and 56 of transformer 54 are polarized as shown in order to provide proper gating action to be hereinafter explained, and the collectors of transistors 50 and 51 are connected to the inputs of amplifiers 58 and 59, respectively, via capacitors 60 and 61, as shown. Resistors 62 and 63 connect collectors of transistors 50 and 51 to ground to provide in connection with capacitors 60 and 61 a smoothing action to be hereinafter described. The outputs of amplifiers 58 and 59 are connected to the windings of torquers 4 and 6.

In defining the necessary characteristics of the elements of this invention thus far described, it should be mentioned that accelerometers 3 and 16 are angular accelerometers having a sharply tuned natural frequency which is exactly double the spin frequency of the gyroscope rotor. In addition, the power source supplying power source supplying power to the gyroscope motor windings must be of a type which is capable of maintaining a very sharply defined, constant frequency which is that of the resonant frequency of the angular accelerometer. For the sake of simplicity and explanation, many features of gyroscopic systems well-known to the art have been here omitted. For example, the gyro rotor may be a synchronous electrical machine element conventionally driven by a synchronous motor, which in turn is supplied with electric current from a source of constant frequency alternating current. Likewise, the detailed features of the torquers presented have not been explored, since it is obvious to those skilled in the art that one may apply a torque to a gyroscope casing or gimbal in proportion to an electric signal, and the torquers in this system do neither more nor less than this. Finally, it is recognized that pickoffs, such as 35 and 36 in Fig. 3, as well as other torquers, pickoffs, and servos are conventionally employed in connection with the gimbal system shown in Fig. 1 to provide a meaningful and useful output for any gyroscopic system in an aircraft or a missile. Since this invention is intended for use in connection with such systems, it should be understood that in a complete design of a gyroscopically stabilized platform, the usual assembly of interrelated torquers and pickoffs and amplifiers would be employed in connection with the adaptation of this invention to a gyroscopically stabilized platform.

Figure 6:
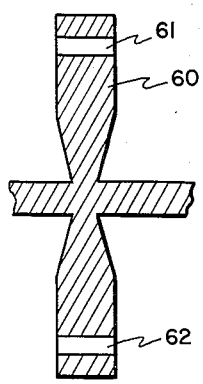
Fig. 6 is a sectional view taken at 6—6 in Fig. 3.

Referring now to Fig. 6, there is shown a partial sectional view of the rotor 60 of gyro 1. Rotor 60 has drilled in its outer rim two diametrically opposed cylindrical holes 61 and 62 with their axes parallel to the axis of rotation of the rotor. Thus, the moment of inertia of a cross-section of the rotor taken through holes 61 and 62 is seen to be substantially less than that taken through a section normal to the above section. The plane of the holes in the rotor thus defines the axis of minor moment of inertia, and the plane normal thereto defines an axis of major moment of inertia. Obviously to achieve the effect of producing a gyro rotor with a major and a minor axis of moment of inertia it is not necessary that holes 61 and 62 be drilled completely through the rotor rim, but these holes may be drilled partly through. Likewise, the shape of the holes is largely immaterial for the purpose of attaining differences in moment of inertia about the two major axes of the rotor. Furthermore, this difference in moments of inertia may be achieved by the simple expedient of adding mass to diametrically opposed portions of the rotor rim, or by constructing a rotor design which is simply not that of a surface of revolution but which is statically balanced for rotation about the rotor spin axis.

In operation, the system functions as follows. The rotor of gyroscope 1 is rotated at a uniform speed such that it acquires a constant spin frequency. Now the rotor of gyroscope 1 is a conventional rotor except for the one important feature mentioned above. That feature is that it is of such a geometry that about one axis in the plane of spin it has a greater moment of inertia than about an axis perpendicular thereto in the plane of spin. In other words, the gyroscope wheel may be of uniform geometry except that it may have two diametrically opposed holes drilled in it parallel to the spin axis. Or it may have additional mass added to two diametrically opposed points on its rim. This dynamic unbalance may even take the form of a rotated dumbbell, in the extreme case. However, for practical purposes, it is only necessary to drill two diametrically opposed holes in the wheel of a conventional gyroscope.

Now, as is well-known, when a disturbing torque is applied to such a spinning gyroscopic wheel, the resulting precession of the gyroscope tends to be different than if the gyroscopic wheel is dynamically balanced. If a conventional gyroscope having a dynamically balanced wheel and some damping is subjected to a steady disturbing torque, the resulting precession is smooth and uniform. After transients have decayed, however, if the wheel is thus dynamically unbalanced, there is produced an angular acceleration of the gyroscope casing which is at twice the spin frequency of the gyroscope. This angular acceleration is produced because of the changing moments of inertia available to resist the applied torque and it does not decay as long as the disturbing torque persists. The precession then occurs in a pulsating or vibrating manner, giving rise to angular accelerations of the casing. These accelerations occur at precisely twice the spin frequency of the gyroscope because of the fact that there are two positions of maximum moment of inertia for each revolution of the gyroscope wheel. Accordingly, angular accelerometer 3, being tuned to this exact frequency, produces an alternating current signal of this frequency. Now, the reference generator 19 also produces a signal of frequency exactly equal to twice the spin frequency of the gyroscope rotor. However, assuming the application of an unknown disturbing torque to the gyroscope, the relative phase between the output of the angular accelerometer and the output of the reference generator defines the direction from which the disturbing torque is applied. If it is assumed, for example, that the axis defined by stub shafts 23 and 24 in Fig. 3 is the axis of minor moment of inertia, i.e., of least moment of inertia of the gyroscope rotor, and that the axis defined by the stub shafts 27 and 28 is the axis of maximum moment of inertia or major moment of inertia of the gyroscope rotor at time T=zero, then the angle by which the phase of the output of accelerometer 3 leads or lags the output of reference generator 19 defines the angle of application of the total disturbing torque, giving rise to the output of angular accelerometer 3. If angular accelerometer 3 has no output, there is no disturbing torque. If it has an output, the direction of the disturbing torque is defined by the angle by which the phase of the output of angular accelerometer 3 leads or lags the output of reference generator 19 and this angle is measured in the direction of rotation of the rotor of the gyroscope 1, whatever that direction may be.

Referring now to Fig. 2, it is desired to apply to torquers 4 and 6 a combination of torques such that the spurious vector will be cancelled out or nullified. This is accomplished by comparing the phase of reference generator 19 and accelerometer 3 in the circuitry shown in Fig. 2. While any one of a number of practical circuits could be devised to excite torquers 4 and 6 by an appropriate amount, the circuitry of Fig. 2 offers a convenient means for doing this. The function of reference generator 19 in Fig. 2 may be analogized to the opening and closing of a gate to each one of the torquers so that each of the torquers sees only a portion of the output of accelerometer 3 for a defined period. Thus, in Fig. 2, the alternating current signal output of accelerometer 3, which occurs at twice the spin frequency, is applied to the emitters of transistors 50 and 51 in parallel. On a positive-going half-cycle of the output of reference generator 19, the base of transistor 50 is made positive and the base of transistor 51 is made negative by virtue of the polarity connections of transformer windings 53 and 56, as shown. Thus, in the half-cycle under consideration, transistor 50 conducts and transistor 51 does not conduct. Therefore, during the half-cycle of reference generator 19 under consideration, any signal then being generated by accelerometer 3 is transmitted via the collector of transistor 50 to capacitor 60, thence to amplifier 58. If accelerometer 3 has no output, then amplifier 58 receives no signal. On the other hand, if accelerometer 3 is in a positive-going half-cycle at the same time as reference generator 19, then a full half-wave of the output of accelerometer 3 is transmitted to capacitor 60. Also, if the output of accelerometer 3 lags the output of reference generator 19 slightly, capacitor 60 will receive a portion of the negative-going half-wave of the output of accelerometer 3 and the major portion of the positive-going portion of the half-wave output of accelerometer 3. The function of capacitor 60 and resistor 62 is to provide to the input of amplifier 58 an average signal as it appears during any open half-cycle of the gate, e.g., during the positive-going half-cycle of reference generator 19, the input to amplifier 58 is proportional to the phase angle by which the output of accelerometer 3 leads or lags reference generator 19. During the succeeding half-cycle of the output of reference generator 19, transistor 50 is blocked and transistor 51 conducts, and, again, amplifier 59 receives the portion of the output of accelerometer 3 as it exists during that half-cycle. However, this signal is applied to torquer 6. The result is that torquers 4 and 6 receive torques the resultant of which is in a direction to counteract the applied disturbing torque which gave rise to the output of accelerometer 3. When this torque reaches a value sufficient to counteract the disturbing torque, the output of accelerometer 3 ceases and torquers 4 and 6 receive no signal. On the other hand, if torquers 4 and 6 apply too great a torque so that the disturbing torque is overcorrected, this condition is immediately sensed by accelerometer 3 and a signal of opposite phase is generated, which signal again gives rise to oppositely corrective torques.

It can thus be seen that no matter what the direction of the disturbing torque vector is, there is produced by the combination of torquers 4 and 6 a corrective torque whose direction is opposed to the disturbing torque. Since the outputs of torquers 4 and 6 are always in opposition to the applied disturbing torque, in the final result which occurs over perhaps a few cycles of the output of accelerometer 3 and reference generator 19, the disturbing torque is effectively nullified and the gyroscope has thus been effective through the agency of the tuned angular accelerometer in detecting and correcting its own disturbing torques.

Referring back to Fig. 1, the operation of gyroscope 15, together with reference generator 20 and accelerometer 16 in phase comparator torquer resolver 22, is identical to that discussed above in connection with gyro 1, it being understood that the circuitry presented in Fig. 2 corresponds to that shown in Fig. 1 as phase-comparator torquer-resolver 21 or phase-comparator torquer-resolver 22.

Although the present invention has been described with a certain degree of particularity, it is understood that various modifications in the details and arrangements of parts may be had without departing from the spirit and scope of the invention as hereinafter claimed.

I claim:

1. Stabilizing means comprising a statically balanced rotating mass having differing moments of inertia about orthogonally disposed axes in its plane of rotation, a casing supporting said mass for rotation therein, gimbal means rotatably supporting said casing for rotation about an axis normal to the axis of rotation of said mass, reference frame means rotatably supporting said gimbal means about an axis normal both to said axis of rotation of said mass and said axis of said casing, means responsive to angular accelerations of said casing at a frequency double the rotative frequency of said mass for torquing said gimbal means in the sense required to reduce said angular accelerations to zero.

2. Gyroscopic apparatus comprising in combination a two degree of freedom dynamically unbalanced gyroscope, an angular accelerometer mounted on the casing of said gryroscope for detecting angular accelerations thereof about a non-spin axis thereof and having a natural frequency equal to twice the rotative speed of said gyroscope, and means applying torques to said gyroscope in response to the output of said accelerometer.

3. In a gyroscope, a statically balanced but dynamically unbalanced rotor, a casing enclosing said rotor and supporting it for rotation, motor means driving said rotor at constant speed, and accelerometer means for detecting angular accelerations of said casing about any axis non-parallel to the axis of rotation of said rotor.

4. A device as recited in claim 3 and further comprising means for applying torque to said gyroscope casing in response to said accelerometer means.

5. A device as recited in claim 3 in which said accelerometer is resonant to a frequency twice the rotative speed of said rotor.

6. A device as recited in claim 5 and further comprising means for applying torque to said gyroscope casing in response to said accelerometer means.

References Cited in the file of this patent

UNITED STATES PATENTS

| | | |
|---|---|---|
| 1,801,619 | Arrea | Apr. 21, 1931 |
| 2,078,729 | Lemoine | Apr. 27, 1937 |
| 2,367,465 | Kunzer | Jan. 16, 1945 |
| 2,605,093 | Dorand | July 29, 1952 |
| 2,620,570 | Minas | Dec. 9, 1952 |
| 2,716,893 | Birdsall | Sept. 6, 1955 |

FOREIGN PATENTS

| | | |
|---|---|---|
| 599,826 | Great Britain | Mar. 22, 1948 |